UNITED STATES PATENT OFFICE.

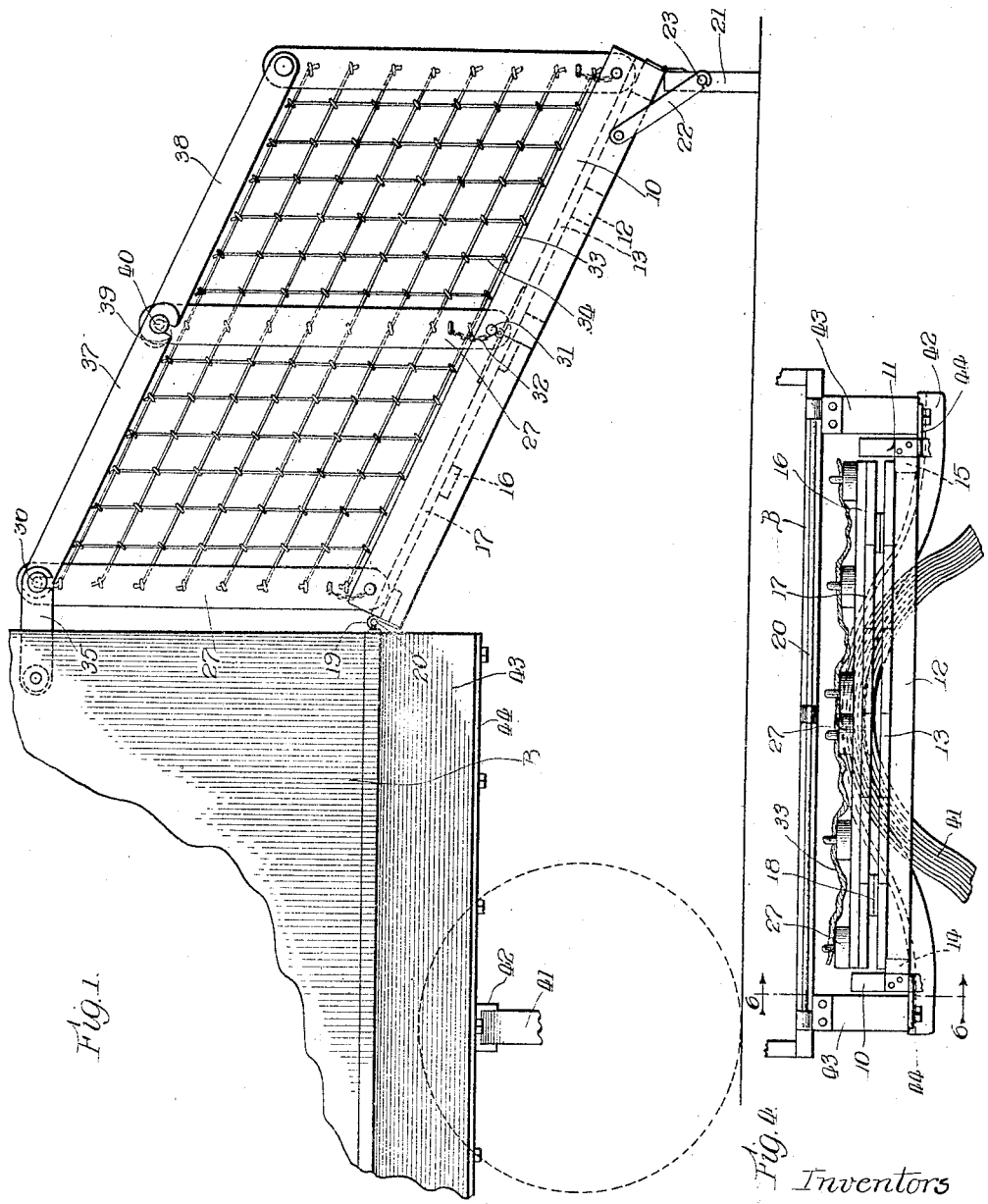

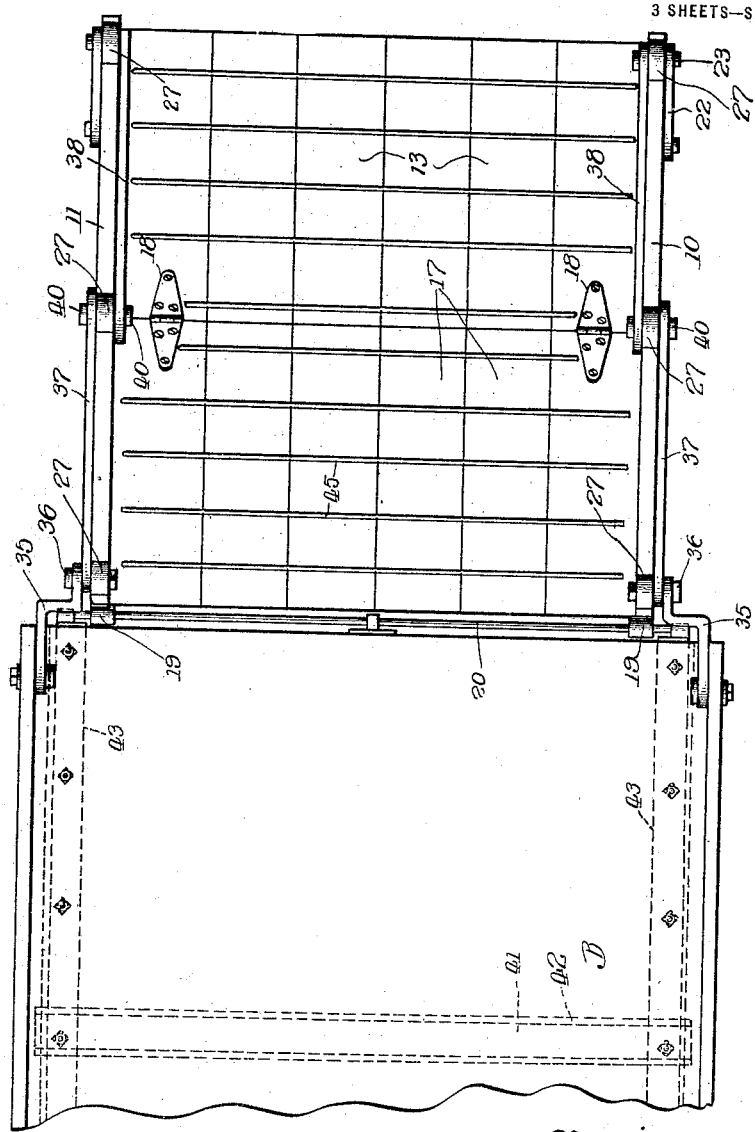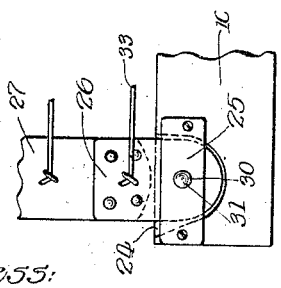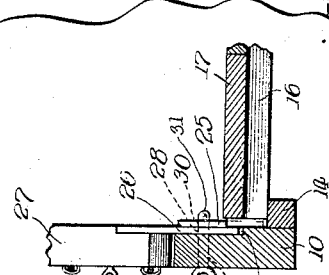

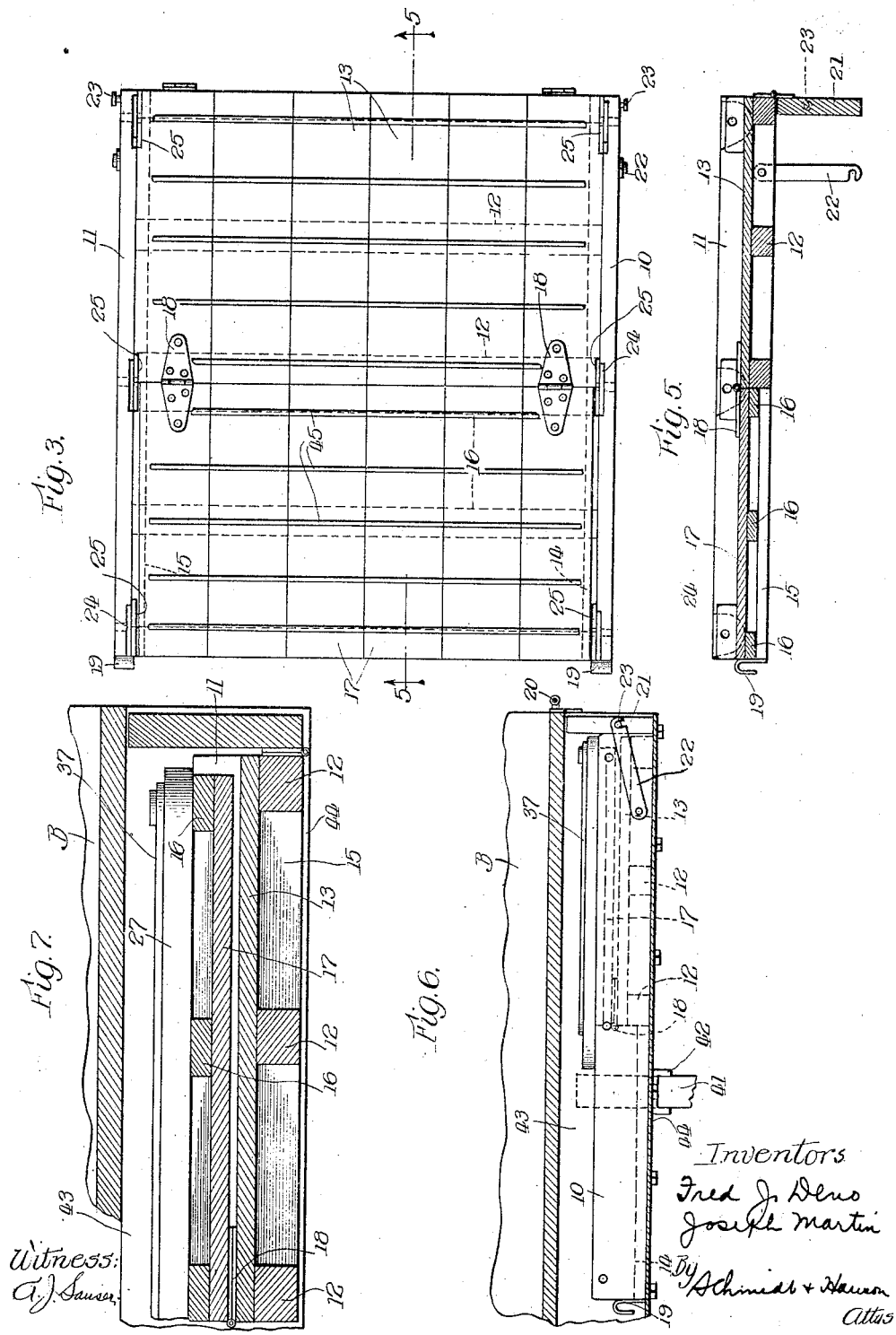

FRED J. DENO AND JOSEPH MARTIN, OF FOWLER, INDIANA.

HOG-CHUTE.

1,383,080. Specification of Letters Patent. Patented June 28, 1921.

Application filed April 8, 1920. Serial No. 372,160.

*To all whom it may concern:*

Be it known that we, FRED J. DENO and JOSEPH MARTIN, citizens of the United States and residents of Fowler, in the county of Benton, State of Indiana, have invented certain new and useful Improvements in Hog-Chutes, of which the following is a specification.

Our invention relates to hog chutes and particularly to chutes which can be utilized with efficiency in connection with vehicles having running gear and springs of the Ford type.

Among the important objects of our invention are to provide a chute which can be folded up compactly, and stored below the body of a vehicle between the rear springs and the rear end of the body; to provide improved side structures for the chute which can be readily removed and folded together; to provide side structures comprising a number of posts together with means for permitting such posts to at all times assume vertical position; to provide a chute structure which can be used with equal efficiency for bridging the space between the back end of a vehicle and a loading platform; and in general to provide simplified and more efficient construction and operation for structures of the class referred to.

The various features of our invention are incorporated in a structure shown on the accompanying drawing in which—

Figure 1 is a side elevational view of the rear end of the vehicle and our improved chute structure applied thereto in operative position, Fig. 2 is a plan view of the parts shown in Fig. 1, Fig. 3 is a plan view with the side supporting posts removed, Fig. 4 is a rear elevational view of the chute structure folded together and supported below a vehicle body.

Fig. 5 is a sectional view on plane 5—5, Fig. 3,

Fig. 6 is a sectional view on plane 6—6, Fig. 4,

Fig. 7 is an enlarged sectional view similar to Fig. 5, showing the chute floor folded together, Fig. 8 is an enlarged side elevational view showing the seating of one of the side supporting posts in the chute side beams and Fig. 9 is an end elevational view of the parts shown in Fig. 8.

The chute comprises the side beams 10 and 11, connected at their outer ends by cross pieces 12 on which are secured the floor boards 13, this outer floor being fixed and extending about half the length of the side beams. At the inner ends of the side beams ledge strips 14 and 15 are secured to the side beams adjacent the lower edges thereof, and these strips serve to support the cross pieces 16 on which are secured the floor boards 17 which form the inner floor section. This inner floor section is hinged to the fixed floor section by hinge members 18 and the hinged section can be swung outwardly and downwardly against the top of the fixed floor section as shown in Figs. 6 and 7. When the floor sections are thus folded together, there is a clear space between the inner half section of the side beams, the purpose of which will appear later. At the inner ends of the side beams are secured hooks 19 by means of which the chute is secured in operative position to the body of a vehicle, the hooks being shown in the drawing as engaging with the bar 20 secured to the rear end of the vehicle body B. When the hooks engage with the bar, the chute can be extended from the vehicle body to a loading platform or can be inclined to the ground for loading of cattle such as hogs. In order to keep the end of the chute from sinking into soft ground, or into water on the ground, a prop board 21 is hinged along the outer end of the chute to be swung into vertical position between the chute end and the ground as clearly shown in Fig. 1.

To hold the prop board in its position, hooks 22 may be provided for engaging with pins 23 extending from the board end.

We provide improved flexible side wall structures for the chute which can be removed, folded, and compactly placed on the folded floor sections when the chute structure is not in use. In the chute side beams slots or vertical grooves 24 are provided, adjacent the inner faces of the beams and are spanned by plates 25 so that sockets are formed for receiving the tongue plates 26 extending from and secured to the lower ends of the posts 27. These tongues have holes 28 in their projecting ends which, when the tongues are within the sockets, register with the holes 29 and 30 through the side beams and cross plate respectively so that pivot pins 31 may be inserted to secure the posts in pivotal connection with the chute side beams. The engagement of the tongues in the sockets will rigidly hold the posts against swinging transversely of the chute, but the pin connection will permit the posts to swing in the planes of the chute side beams. The pins may be supported from the posts by chains 32 so that they will not become lost and will be readily available when the posts are to be secured to the chute floor structure. The posts for each side wall structure are connected by longitudinal and transverse strands 33 and 34 respectively, the resulting fence or grille extending between the posts and being flexible to permit the posts to swing in vertical planes longitudinally of the chute side beams so that when the chute is inclined, the posts will nevertheless maintain a vertical position. This permits the inner ends of the side wall structure to be brought close up to the end of the vehicle body to prevent escape of animals between such body and the adjacent end of the chute. As shown, hook members 35 are pivoted on the vehicle body and engage with pins 36 extending from the tops of the inner side posts, these hook structures holding the inner side posts in vertical position parallel with the rear end of the vehicle body. There is thus no chance for escape of animals after they have started to travel up the chute, and when unloading, the animals can leave the vehicle body only by way of the chute. In order to keep the other side posts parallel with the inner posts, top rail boards 37 and 38 are provided for each side wall structure and are respectively hinged to the upper ends of the inner and outermost posts and at their inner ends have slots 39 for receiving a latch pin 40 extending from the center post.

When it is desired to fold up the chute structure, the pins 31 are withdrawn and the rail boards 37 and 38 unhooked from the pins 40, and swung down alongside of the inner and outer posts respectively. The side structures can then be compressed and laid between the chute side beams after the hinged floor section has been swung on top of the fixed floor section. The prop board is then swung upwardly against the outer ends of the chute beams and locked in such position by the hooks 22.

In Figs. 1, 2 and 3, we have shown the rear end of a truck of the Ford type in which the rear vehicle spring 41 extends transversely and over and parallel with the rear axle, the arrangement being well known in the art. In the structure shown, the cross beam 42 secured on the spring 41 assists in supporting longitudinal beams 43 on which the vehicle body B is mounted. In order to accommodate and store our improved hog chute in folded condition below the vehicle body, we provide ledge plates 44 secured against the underside of the beams 43 and projecting inwardly a distance therefrom. The space between the beams 43 is such as to readily receive the folded chute structure on the ledge plates 44 as clearly shown in Fig. 4. The purpose of the hinged floor section of the chute structure is now apparent. The distance between the vehicle spring and the outer end of the vehicle body is not sufficient to receive the full length of the chute structure but by hinging a section of the floor, the structure can readily be accommodated. By providing the hinged floor section, the chute side beams at their inner ends are free to extend inwardly along the bottom of the vehicle body and between such body and the cross beam 42. The fixed floor section of the chute is of a length to be readily received between the vehicle spring and the end of the body. After removal of the chute structure from the vehicle after use thereof, it is folded up as before described and shoved along the ledge plates 44 until the inner end of the folded floor section abuts against the vehicle spring 41. The prop board 21 will then, in its raised position, form a closure for the space which receives the chute structure, as clearly shown in Fig. 6.

We thus produce a strong, light, and efficient chute structure which can be readily folded up into small space and stored conveniently below a vehicle body. The structure can readily be withdrawn from the body and hooked thereto and connected to form a chute or passageway from which animals cannot escape. To give the animals footing on the floor boards, they may be provided with cleats 45.

As changes and modifications can no doubt be made without departing from the scope of our invention, we do not desire to be limited to the precise construction, arrangement and operation which we have shown.

We claim the following:

1. In a hog chute, the combination of side beams, hooks at the front ends of said side beams for engaging with supporting members of a wagon body, a fixed floor section between the front ends of said beams and a floor section between the inner ends of said beams hinged to the fixed floor section and adapted to be swung against the top thereof.

2. In a hog chute, the combination of side beams, a floor section secured between the side beams substantially throughout the front half thereof, a movable floor section for the rear half of said side beams hinged to said fixed floor section and adapted to be folded against the top thereof, and collapsible side structures having detachable connection with said side beams.

3. In a hog chute, the combination of side beams, cross pieces secured to and spacing said side beams along substantially one half thereof, floor boards secured to said cross pieces to form a permanent floor section, longitudinal ledges secured adjacent the lower edges of said side beams substantially along the remaining half thereof, floor boards, cross pieces receiving said floor boards, said cross pieces being adapted to rest on said ledge strips and said floor section being hinged to said permanent floor section to be swung against the top thereof, and supporting hooks at the front ends of said beams.

4. In a hog chute, the combination of side beams, cross pieces secured to said side beams along substantially one half thereof, floor boards secured to said cross pieces to form a permanent floor section extending over substantially the outer half of said structure, ledge plates secured against the inner sides of said side beams along the other half thereof, an inner floor structure comprising floor boards and cross pieces, said ledge strips receiving said cross pieces to support said rear floor section, said rear floor section being hinged to the permanent floor section to be swung against the top thereof, and collapsible side wall structures having detachable connection with said side beams.

5. In a hog chute, the combination of side beams, floor boards extending between said side beams, said side beams having sockets, posts adapted to be detachably set in said sockets, and flexible members connecting said posts to form collapsible side wall structures.

6. In a hog chute, the combination of side beams, floor boards extending between said side beams, sockets in said side beams, posts adapted to be detachably engaged in said sockets, to be rigid against transverse swing but adapted for longitudinal swing, yieldable members connecting said posts for permitting swing thereof and forming flexible side wall structures, and supporting hooks in the inner ends of said side beams.

7. In a hog chute, the combination of a floor structure, hooks at one end of said floor structure for supporting the same from a support, said floor structure having sockets adjacent the sides thereof, posts adapted to seat in said sockets and to swing in vertical planes longitudinally of said floor structure, flexible members connecting said posts to form flexible side wall structures, and rail boards adapted to be detachably connected to the upper ends of said posts.

8. In combination a vehicle body, longitudinal beams supporting said body, ledge plates secured to the lower end of said beam, and a collapsible hog chute structure adapted to be slid along said ledge plates into position below said body.

9. The combination with a vehicle body, of longitudinal supporting beams thereunder, ledge plates extending from said beams at the lower ends thereof, a hog chute comprising side beams adapted to be received on said ledges, said chute having a collapsible floor structure, collapsible side walls for said chute structure having detachable connection therewith, hooks on said chute structure for supporting it on said vehicle body, and additional hooks for securing said flexible wall structures to said vehicle body.

10. In combination a vehicle body, longitudinal supporting beams below said body, ledge plates secured to said beams, a hog chute adapted to be slid on and to rest on said ledge plates, and a prop board forming part of said hog chute for closing the space between said vehicle body and its supporting beams.

In witness whereof we hereunto subscribe our names this 5th day of April, A. D. 1920.

FRED J. DENO.
JOSEPH MARTIN.